United States Patent [19]
Kerr

[11] 3,986,740
[45] Oct. 19, 1976

[54] ACCESS DOOR FOR DUCTWORK
[75] Inventor: Norman Sergent Kerr, Agincourt, Canada
[73] Assignee: Kerr-Hunt and Associates Limited, Markham, Canada
[22] Filed: July 1, 1975
[21] Appl. No.: 592,106

[30] Foreign Application Priority Data
July 18, 1974 Canada ............................... 205069

[52] U.S. Cl. .......................................... 292/256.69
[51] Int. Cl.² ....................................... E05C 19/14
[58] Field of Search .......... 292/DIG. 49, 113, 256.6, 292/256.69, 247

[56] References Cited
UNITED STATES PATENTS
3,261,632  7/1966  Schaefer ...................... 292/256.69

Primary Examiner—Richard E. Moore

[57] ABSTRACT

This invention relates to an access door arrangement for easy entry into ductwork. The access door has a circular collar member which has a flat inner flange that threads into a hole in the ductwork. A closure member is located over an outer flange on the collar member. An annular gasket may be placed between the outer flange and the closure member for sealing or insulating purposes. The closure member is held firmly over the hole by a retaining ring which is placed over the closure member with its ends drawn together and held by a clasp and latch arrangement. The access door is very quickly and easily opened by merely releasing the retaining ring by opening the clasp and latch arrangement and moving the closure member off the collar. Furthermore, the whole access door arrangement is readily and quickly installed on ductwork by turning the inner flange into or out of a properly sized hole.

4 Claims, 6 Drawing Figures

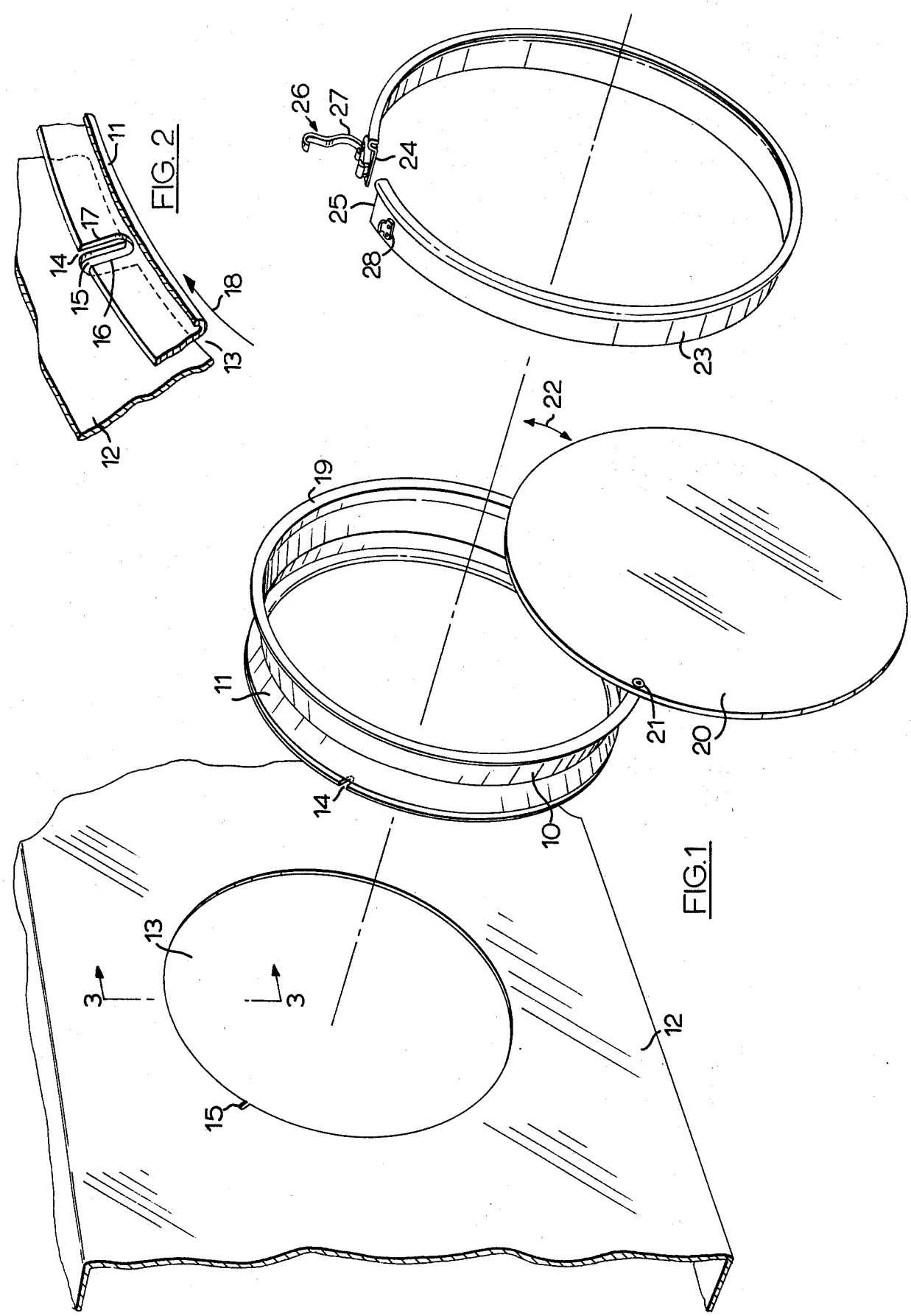

ACCESS DOOR FOR DUCTWORK

The present invention relates to an access door for entry into ductwork and, more particularly, to an access door which is easily installed on ductwork and which is easily and quickly opened and closed when entry to the duct is desired.

In the design, construction and maintenance of buildings, it is sometimes necessary to have access to the interior of ductwork or chutes. In the past, it has been necessary to use elaborate doors or locking mechanisms which are costly and difficult to install and time-consuming to use. The openings or doors were closed or locked by such devices as retaining springs, wing nuts, bolts, or pressure fits some of which required the use of tools to open the door. Typical of such doors are those described in U.S. Pat. Nos. 2,507,885 and 3,773,086.

It has now been discovered that the disadvantages of previous access doors can be overcome by an arrangement comprising a circular collar member which can be screwed in or out of a hole in ductwork and which has a closure member thereon which is easily and quickly installed on or removed from the collar by way of clip-on type retaining ring.

It is an object of this invention to provide rapid and easy access to the interior of a duct or chute.

It is a further object of the invention to provide an access door arangement that can be installed easily and quickly in ductwork with a minimum of cutting.

It is an object of this invention to provide an easily and quickly installable access door for ductwork which can be closed securely to suppress noise and to keep gas leakage from the duct at a minimum.

These and other objects of this invention will become apparent from the following description taken in conjunction with the following drawings, which illustrate an embodiment of the invention and in which:

FIG. 1 is an exploded perspective view of an access door arrangement;

FIG. 2 is a view showing how the frame of the access door fits into a hole in the ductwork;

Figure 3:
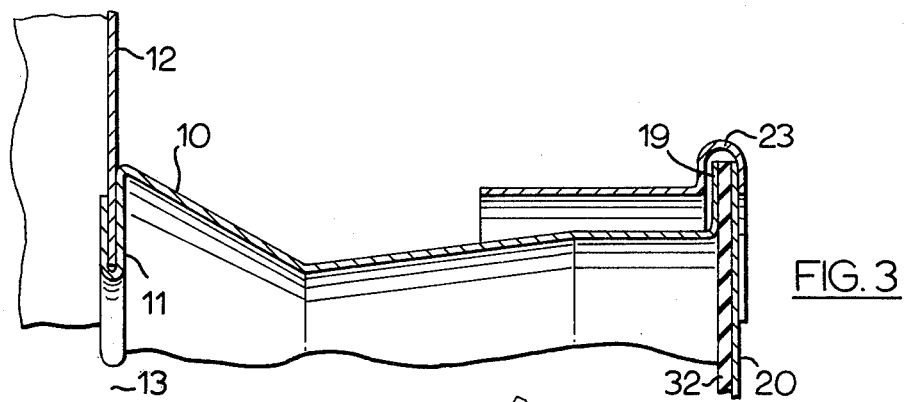
FIG. 3 is a cross-section of one side of the access door arrangement taken along line 3—3 of FIG. 1.

The access door of the invention comprises a collar member which is of generally circular configuration and which has an inner flange thereon for connection into a hole in ductwork, notches being provided in the edge of the hole and in the inner flange whereby the collar member can be screwed or turned into the duct. An outer flange is provided on the collar member and a closure member is releasably attached to and covers the outer flange. A retaining ring having separated ends is located around the outer flange and closure member and the ring retains the closure member against the outer flange in close engagement therewith. A clasp and latch arrangement attached to the ends of the retaining ring releasably hold it in a closed position. The retaining ring is expandible to an open position upon release of the clasp and latch arrangement, allowing the ring to be easily removed from the outer flange and closure member.

Referring now to FIGS. 1 and 2 of the drawings, which illustrate a preferred embodiment of the access door arrangement of the invention, in an exploded perspective view, a collar member 10 has an inner flange 11 integral therewith and the flange 11 is adapted for attachment to a duct 12 over hole 13 therein. Attachment is provided by way of a notch 14 in the flange 11 which mates with and turns into a second notch 15 off the hole 13 in the duct 12. It can be seen that, with this arrangement, the flange 11 is readily turned or screwed into the duct 12 over the hole 13. It can be appreciated that the notch 14 can be cut into the inner flange 11 upon manufacture of the access door arrangement or, along with the notch 15, can be cut into the flange 11 and the duct 12 on the job.

Operation of the notches 14, 15 in attachment of the access door arrangement is shown in FIG. 2 of the drawings. As aforedescribed, the notch 14 in the inner flange 11 mates with the notch 15 in the duct 12. Edge 16 of the notch 14 is turned inwardly and edge 17 of the notch 15 is turned outwardly. Turning of the flange 11 in the direction of arrow 18 results in running of the flange 11 behind the rim of the hole 13 in the duct 12 and a 360° rotation places all of the flange 11 behind the duct 12. The process is reversed to remove the flange 11 and the access door arrangement from the duct 12.

The collar member 10 has an outer flange 19 integral therewith and a closure member 20 covers the outer flange 19, although in FIG. 1 the closure member is seen partially turned so that the outer flange 19 is partially uncovered and mostly visible. Advantageously the closure member 20 is pivotally attached to the outer flange 19 by way of pin 21 and pivotal movement of the member 20 in either direction of arrows 22 opens or closes the access door as desired. The closure member 20 is releasably attached to the outer flange 19 by way of retaining ring 23 having separated ends 24, 25 which is located around the outer flange 19 and the closure member 20. Thus, the ring 23 retains the closure member 20 against the outer flange 19 in engagement therewith around the full periphery of both elements. A clasp and latch arrangement 26 is located on the separated ends of the retaining ring 23, with catch member 27 on the end 24 and holding member 28 on the end 25. Placement of the retaining ring 23 on the closure member 20 and the outer flange 19, with closing of the clasp and latch arrangement 26, results in a releasable holding of the retaining ring 23 in a closed position, as described hereinafter with reference to FIG. 5.

In the exploded view of FIG. 1, the retaining ring 23 is, of course, removed from the retaining position around the elements 19, 20 and is expanded to an open position, with the clasp and latch arrangement 26 being released and separated.

Referring to FIG. 3 of the drawings, a broken away portion of one side of the access door arrangement fully assembled, is shown, through line 3—3 of FIG. 1. The inner flange 11 on the collar member 10 is seen to be located behind the duct 12 over the hole 13. The closure member 20 is located over and covers the outer flange 19 and is releasably attached thereto by means of the retaining ring 23. Advantageously, a gasket 32 is located between the members 19, 20 to provide improved sealing engagement therebetween and, if necessary, to provide insulation and/or a noise depressant member for the access door arrangement. The gasket 32 is advantageously attached to the closure member 20. As can be seen from FIG. 3, the inner flange 11 has a double wall by way of being turned back on itself, so as to make it U-shaped. This arrangement allows for proper gripping support for the access door arrangement on the wall of duct 12, the arms of the U in the flange 11 being only far enough apart to provide a close fit on the wall of the duct 12. The notch 14 in the flange 11 (see FIGS. 1 and 2) is, of course, located on the arm of the U which has been threaded into the duct 12.

Figure 4:
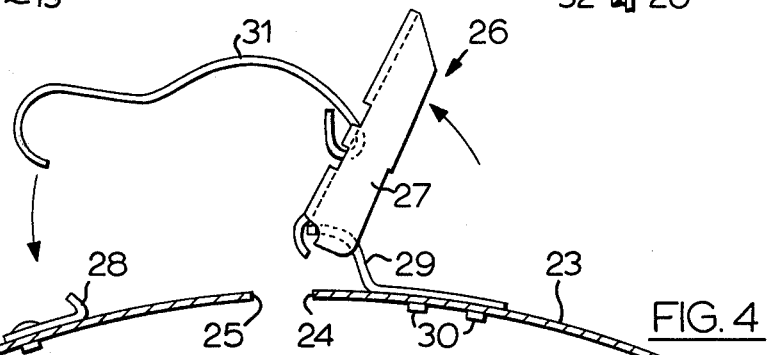
FIG. 4 shows a latching device for the door in the open position.
Figure 5:
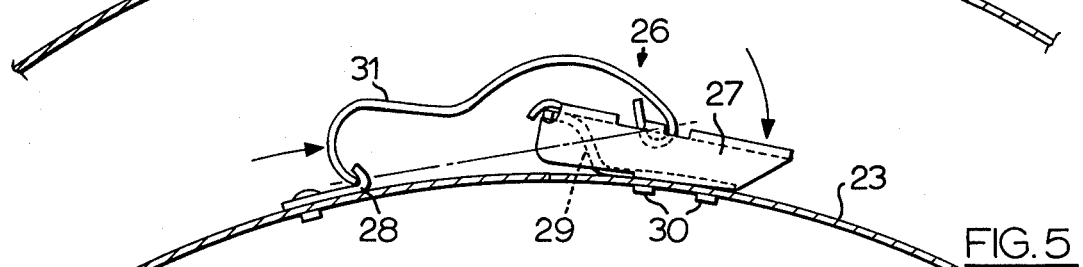
FIG. 5 shows the latching device of FIG. 4 in the closed position.

The operation of the clasp and latch arrangement 26 on the retaining ring 23 is illustrated by FIGS. 4 and 5 of the drawings. Before placement over the outer flange and the closure member, the retaining ring 23 is expanded to an open position as shown in FIG. 4. The ring is placed over the flange and the closure member and the catch member 27 is raised by pivoting on holding member 29, which is attached to the ring 23 by rivets 30, as shown in FIG. 4. Clasp 31, pivotal on the catch member 27, is then lowered so as to be caught behind the holding member 28 when the catch member 27 is lowered to the closed position, as shown in FIG. 5. This brings the retaining ring 23 to a closed position around the outer flange and the closure member, with the ends 24, 25 being pulled together.

Figure 6:
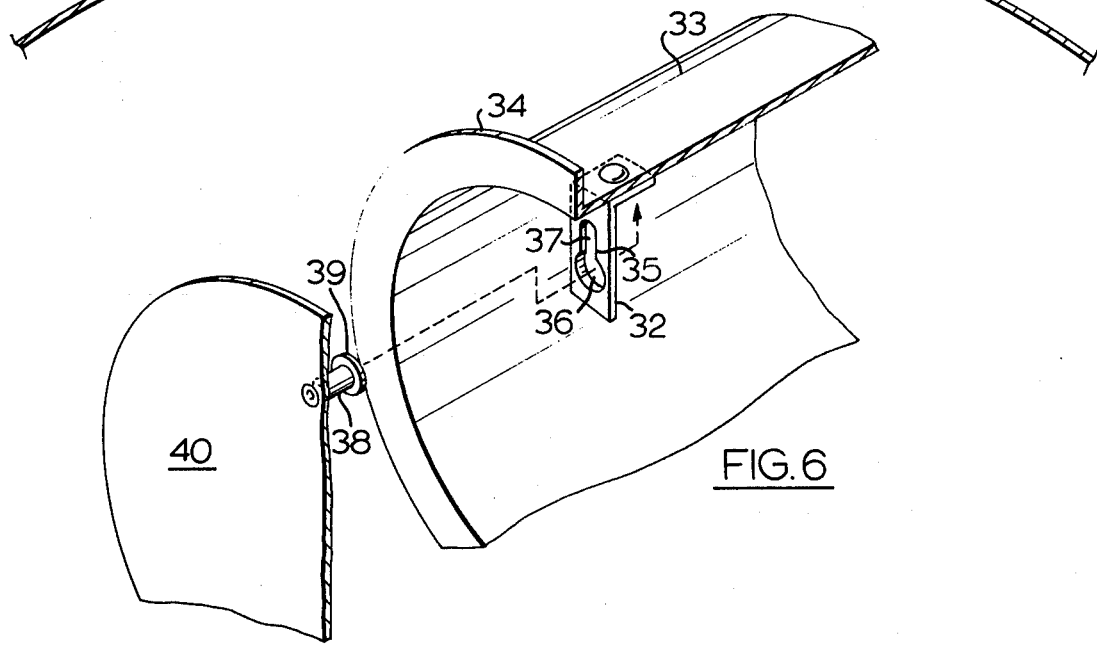
FIG. 6 is a perspective view of an alternate arrangement of closure member for the access door.

Although, in referring to FIG. 1, the closure member 20 is shown pivotally attached to the outer flange 19 on the collar member 10 by way of the pin 21, removable attachment of the closure member is advantageously arranged by a pin and slotted bracket arrangement. Referring to FIG. 6, a broken-away view of a portion of an access door arrangement embodying the invention is shown with bracket member 32 attached to collar member 33 having outer flange 34, corresponding with the collar member 10 and the outer flange 19 of the embodiment shown in FIG. 1. The bracket 32 has an elongated slot 35 therein with a larger diameter portion 36 at one end thereof and narrower, slotted portion 37 at the other end thereof. A pin 38 with an enlarged head 39 is attached to closure member 40 and the pin 38 is normally pivotally located in the slotted portion 37 of the bracket 32. The closure member 40 is normally opened by turning it away from the collar member 32 while the pin 38 pivots in the slotted portion 37. However, the closure member 40 can be readily completely removed, if necessary, from the collar member 33 by sliding the pin 38 along the slot 35 and into the large diameter portion 36. The enlarged head 39, which is smaller in diameter than the portion 36 can then be withdrawn from the slot 35 to free the closure member 40. The process is merely reversed to replace the closure member.

It can be seen that the arrangement of the invention provides an access door for ductwork of very simple and inexpensive construction which is easily and quickly installable and which can be quickly opened and closed without resorting to time consuming removal of bolts and screws or the operation of complex retaining mechanisms.

What I claim is:

1. An access door arrangement for ductwork comprising a collar member of general circular configuration, said collar member having an inner flange for connection into a hole in ductwork and an outer flange, the said inner flange being U-shaped by being doubled back on itself, the arms of the U being separated so as to provide gripping support for the access door arrangement on the ductwork to be fitted, and the said inner flange having a notch therein allowing the inner flange to be threaded into a matching notch provided in the rim of a hole in said ductwork, a closure member releasably attached to and covering the outer flange, a retaining ring having separated ends located around the outer flange and closure member and retaining the closure member against the outer flange and a clasp and latch arrangement on the separated ends of the retaining ring releasably holding the retaining ring in a closed position, said retaining ring being expandible to an open position upon release of the clasp and latch arrangement.

2. An access door arrangement as claimed in claim 1 wherein the closure member is pivotally attached to the outer flange by a pin.

3. An access door arrangement as claimed in claim 1 wherein a gasket is placed between the closure member and the outer flange.

4. An access door arrangement as claimed in claim 1 wherein the closure member is pivotally and removably attached to the outer flange by a pin having an enlarged head and slotted bracket arrangement, said pin with enlarged head being attached to the closure member and said slotted bracket being attached to the collar and having a slot with an end of large diameter into which said enlarged head is fitted.

* * * * *